(12) United States Patent
Cannelli

(10) Patent No.: US 7,352,653 B2
(45) Date of Patent: Apr. 1, 2008

(54) HIGH-RESOLUTION AND HIGH-POWER ULTRASOUND METHOD AND DEVICE, FOR SUBMARINE EXPLORATION

(75) Inventor: Giovanni B. Cannelli, Rome (IT)

(73) Assignee: Consiglio Nazionale Delle Ricerche, Rome (IT)

( * ) Notice: Subject to any disclaimer, the term of this patent is extended or adjusted under 35 U.S.C. 154(b) by 238 days.

(21) Appl. No.: 10/534,926

(22) PCT Filed: Nov. 19, 2003

(86) PCT No.: PCT/IT03/00751

§ 371 (c)(1),
(2), (4) Date: May 13, 2005

(87) PCT Pub. No.: WO2004/046757

PCT Pub. Date: Jun. 3, 2004

(65) Prior Publication Data

US 2006/0039239 A1    Feb. 23, 2006

(30) Foreign Application Priority Data

Nov. 19, 2002  (IT) .................. RM2002A0581

(51) Int. Cl.
*G01V 1/157*  (2006.01)
(52) U.S. Cl. ........................................... 367/147
(58) Field of Classification Search ............ 367/147
See application file for complete search history.

(56) References Cited

U.S. PATENT DOCUMENTS

| | | | |
|---|---|---|---|
| 4,734,894 A | | 3/1988 | Cannelli et al. |
| 4,868,791 A | | 9/1989 | Cathignol et al. |
| 4,899,845 A | * | 2/1990 | Bosco et al. ............... 367/166 |
| 2006/0039239 A1 | * | 2/2006 | Cannelli .................... 367/147 |

FOREIGN PATENT DOCUMENTS

| EP | 0320466 A | 6/1989 |
|---|---|---|
| FR | 1395127 A | 4/1965 |
| WO | WO 2004046757 A1 * | 6/2004 |

* cited by examiner

*Primary Examiner*—Dan Pihulic
(74) *Attorney, Agent, or Firm*—Townsend and Townsend and Crew, LLP

(57) ABSTRACT

A method for underwater exploration which makes use of a parabolic transmitter (1) and a parabolic receiver (3), the transmitter (1) and the receiver (3) being both open at their lower side and immersed below the seawater surface. The electric breakdown discharge occurring between both electrodes (15) of the transmitter (1) generates a primary signal and a pulse which is called "cavitation bubble pulse." The method consists in enhancing the signal (23) produced by the implosion of the cavitation bubble, to the detriment of the primary signal (13"), by appropriately adjusting the value of the "spark gap" (distance d between the electrodes) so as to optimize the delay time (t) and consequently the acoustic efficiency of the transmitter, by transferring the electrostatic energy to the bubble implosion signal.

15 Claims, 9 Drawing Sheets

(a)

(b)

HIGH-RESOLUTION AND HIGH-POWER ULTRASOUND METHOD AND DEVICE, FOR SUBMARINE EXPLORATION

FIELD OF THE INVENTION

The present invention generally concerns a high-power and high-resolution ultrasound method used for submarine exploration (survey), and moreover, it relates also to a device for carrying out the same, including a parabolic (that is, paraboloid-like) transmitter of acoustic waves, having a pair of electrodes adequately positioned around its focus, for causing an electric discharge to occur between the electrodes, this discharge being the cause of the generation of the prospecting signal. This device also includes a receiver, having a paraboloid-like configuration as well, and presenting an acoustic pressure sensor localized in its focus, and being appropriately coupled to the transmitter in such a way as to focus the signals that are reflected by objects and by other inhomogeneities buried below the sediments of the seabed. This device or apparatus is a simplified, but at the same time innovative and improved, version of an ultrasound ecographic system devised by the same inventor of the present application and disclosed in several "national" patents [Applicant (except US): Consiglio Nazionale delle Ricerche; Inventors: Cannelli G. B. and D'Ottavi E.; Title: "Echographic technique-based method and apparatus to detect structures and anomalies of the subsoil and/or sea bottom and the like"; U.S. Pat. No. 4,899,845; EP 0 320 466; DE 3 871 922; Canadian Patent 1,316,249, which has been successfully employed only for soil prospecting at reduced depths, and particularly for archaeological research.

On the contrary, the system of the present patent application has been devised appositely for high-resolution seabed survey, and it is based on the most recent research results obtained at the institute "Istituto di Acustica 'O.M. Corbino'", which is part of the research organization "Consiglio Nazionale delle Ricerche" (CNR), where the corresponding experiments have been conducted under very advantageous conditions, by using the calibration basin of the Laboratory of Underwater Acoustics.

BACKGROUND OF THE INVENTION

Several commercial devices of the sonar kind are used in the exploration of the seabed and of its underlying layers, especially in the field of marine geology, in which a large number of researches attempt to obtain information concerning the nature and distribution of sediments. It is well known that the behavior of acoustic waves propagating through sediments is more complicated to understand, and, specifically, the absorption of acoustic energy is higher than in the water column, especially in the frequency band corresponding to higher frequencies. Traditional acoustic systems seem inadequate to fulfill all possible environmental situations that may be encountered in the exploration of the upper layers of marine sediments, and this is true in particular during prospecting for archaeological research purposes, for which nowadays no high-resolution acoustic devices exist that have an adequate capacity of penetration into the sediments. To be able to carry out this kind of research, two important prerequisites exist with regard to the acoustic prospecting pulse, although, unfortunately, they are often antithetic: 1) a high frequency is required in order to obtain a high resolution, so as to be able to visualize irregularities that may even have small dimensions and that are hidden in the upper layers of the sediment; and 2) an adequate penetration efficiency is required to perform the detection at greater depths, and this means that lower frequencies and a higher acoustic power must be used. Therefore, one should have at his disposal an acoustic source with a large-band frequency spectrum (e.g. from some kHz, up to some hundreds of kHz), and at the same time, a suitable acoustic power. Actually, commercially available acoustic systems do not fulfill both of these requirements at the same time, and consequently they cannot be utilized in an ample range of experimental conditions and marine environmental situations.

For what concerns a parabolic acoustic source of the "sparker" kind—which forms part of the above-cited echographic system, and which, taken alone, has already been disclosed in other patents of the prior art (see Cannelli G. B., D'Ottavi E. and Santoboni S., Electroacoustic pulse source for high-resolution seismic prospecting; U.S. Pat. No. 4,734,894; Canadian Patent 1 250 040; EP 0 230 415; JP Patent 8755/92)—while being adequate to focalize the acoustic wave generated by the electric spark, so that the signal transmitted along the principal axis is characterized by a high power in a certain frequency band, it seems unsuited for marine prospecting, because of the following reasons. The acoustic wave generated by that source is characterized by a "primary pulse" which is followed by one or more secondary pulses due to cavitation bubbles that randomly appear in the time domain. This makes it impossible to discriminate the pulses reflected by the seabed, ascribable to objects buried in the sediments, from the signals due to cavitation and which appear as noise. This drawback does not prevent the preceding echographic system from detecting antique cavities formed in the soil, since it suffices in any case—in order to detect the cavities—to receive a signal reflected by the air-soil interface of the cavity, although this signal is disturbed by the cavitation effect (see for instance FIG. 7 of U.S. Pat. No. 4,899,845, issued to the same inventors). The same inventor of the apparatus of the present application therefore tried—together with others—to minimize the cavitation signals with respect to the primary signal by including in the ecographic device, in place of a single parabolic source, a suitable tuned array of parabolic sources which had also been disclosed in several "national" patents [Cannelli G. B. and D'Ottavi E., Method of high-resolution sea bottom prospecting and tuned array of paraboloidal electroacoustic transducers to carry out such method; JP Patent 5-505235, U.S. Pat. No. 5,398,217, European 0 491 775; Canadian Patent 2,065,457]. By this array one obtains an improvement of the signal in the time domain, but it shows drawbacks such as a lower acoustic efficiency (defined as the ratio between the emitted acoustic energy and the electrostatic input energy), and a considerably limited frequency band that is insufficient for a high resolution, though the latter is indispensable to detect small findings hidden in the upper layer of the marine sediment. Moreover, this apparatus has an excessive cost because it requires a high number of transmission transducers.

SUMMARY OF THE INVENTION

Therefore, the objects of the present invention are to provide a method and a related device, which aim at obtaining a greater acoustic efficiency, a larger acoustic band, a high resolution (so as to discern finds located in the upper layer of the sediments), high power (penetration into the seabed) and a simplified structure (for instance, no third electrode is needed in order to trigger (to strike) the electric discharge between the two electrodes).

A further object consists in the reduction of costs to a commercially very attractive level.

The above objects are attained by means of an echographic acoustic method used in submarine exploration, comprising the following steps:

the realization of a parabolic transmitter, which is immersed in water and is open at its base, the transmitter having a thickness sufficient to prevent energy dispersions through its walls and presenting a predetermined focal length, the latter being selected to be sufficiently long so that the expansion of the bubble generated by the electric discharge occurring between two electrodes that are symmetrically arranged with respect to the focus F is not hindered by the walls of the paraboloid formed by the transmitter, and wherein the electrodes are adjustable in the direction of the line that joins them, to allow to increase or decrease their reciprocal distance d;

the realization of a parabolic receiver, the receiver being open at its base, being immersed in water, and having an acoustic pressure sensor arranged substantially at the focus of the receiver;

the connection of the transmitter to a unit, having a function of control and energy supply, the unit supplying electrostatic energy to the electrodes and transmitting an electric trigger signal to means of the receiver;

the connection of the receiver to data processing and display means, for obtaining diagrams of the type of an oscillogram relating to received signals, and/or for obtaining acoustic images;

and a last step, in which, given a certain value of the electrostatic energy E to be supplied to the electrodes, and given a certain degree of water salinity, the distance d between the two electrodes is adjusted so that a maximum delay time t is obtained between the occurrence of the breakdown electric discharge and a signal due to bubble implosion of the bubble formed during the same discharge, the maximum delay time of the bubble implosion signal being unequivocally correlated to the maximum acoustic efficiency value, which is given by the ratio between the electrostatic energy E and the acoustic energy of the bubble implosion signal, and wherein, under these circumstances, the amplitude of the primary signal directly generated by the breakdown discharge is minimal or negligible.

Furthermore, the invention also relates to the apparatus utilized for the practical realization of this acoustic echographic method.

BRIEF DESCRIPTION OF THE DRAWINGS

The present invention will now be described in more detail with reference to the figures, which show, in an illustrative and non-limitative manner.

DESCRIPTION OF THE PREFERRED EMBODIMENTS

Figure 1:
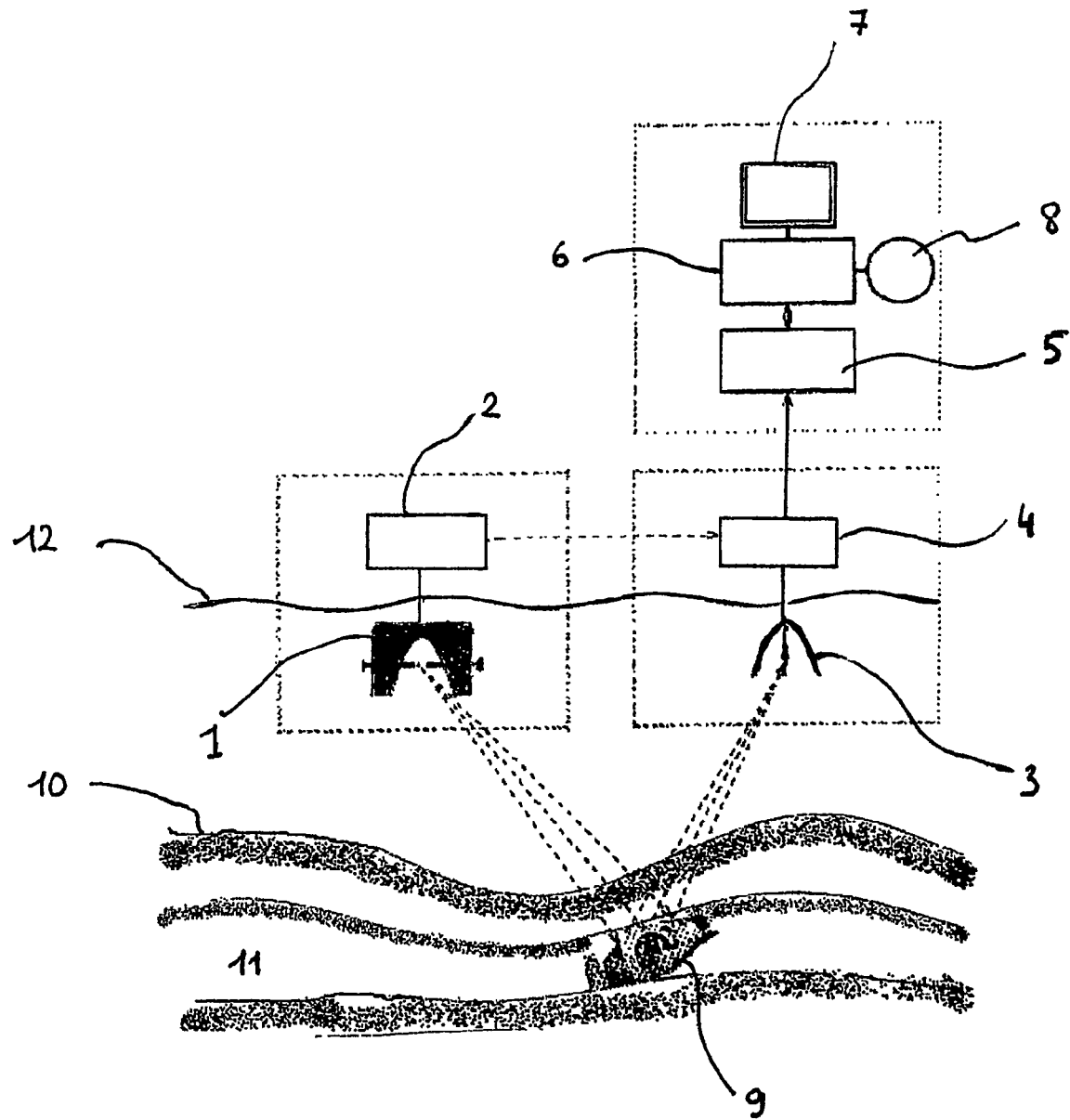
FIG. 1 is a schematic view of the whole echographic apparatus according to the invention.

Before going into the details of the research performed by the inventor, we briefly describe, referring to FIG. 1, the apparatus or device of the present invention. This apparatus includes a parabolic transmitter 1, forming the acoustic source, which is associated with an electronic control unit 2. The transmitter 1 is spaced apart from the receiver 3 by an appropriate distance, which is adjustable according to the prospecting depth. The paraboloidal transmitter 1 is energized by means of a condenser bank (condenser array), not shown in the figures, forming part of the control unit 2. The condenser bank supplies electrostatic energy to the transmitter 1, and the latter converts it into acoustic energy with the aid of the same electronic control unit 2. The receiver, or reception paraboloid 3, is connected to an analog-to-digital converter (ADC) 4 that receives a trigger signal—in the form of an electric signal—from the control unit 2, and transmits the digital data to a microprocessor card (DSP) 5, in order to carry out the successive processing by a dedicated PC 6. The latter displays on the monitor 7 the result of the survey, in the form of an acoustic image of the detected find 9. The numeral 8 denotes a memory used for storing data. The find 9 is buried in the seabed 10, inside the layer formed by the sediments 11. The numeral 12 denotes the seawater surface. It should be noted that in this case, as will be further explained in the following detailed description, the electroacoustic parabolic transducers 1 and 3 are open at their lower sides and are completely immersed in water.

Now, we will describe the principle on which the invention is based, which originated both from research performed on small-size models, and from real conditions encountered in the open sea.

Recent results derived from a systematic research made by the inventor on the "cavitation bubble" have permitted the finding of a very advantageous solution in the technology of parabolic (that is, paraboloid-like) sources, which was called the "bubble implosion" solution. In fact, it was found that by appropriately selecting the electromechanical parameters of the parabolic source it is possible to concentrate in a single pulse a substantial part of the electrostatic energy, and more precisely, to concentrate this energy exactly in that pulse which is generated by the collapsing cavitation bubble and which was previously considered as noise (disturbance). This new method seems simpler and more advantageous than the previous one which was based on an "array", since it is able to provide—using a single transducer—an acoustic pulse having a greater power and efficiency together with a very wide frequency band, which cannot be found in any device of the sonar kind actually commercialized. This system is therefore suited to fulfill the two fundamental prerequisites for the exploration (survey) of marine sediments: high resolution, for detecting objects of small dimensions buried in the upper layers, and an adequate power, in case it is necessary to penetrate deeper into the seabed. Moreover, the parabolic transmitter 1 according to the present invention is much simpler and less expensive than the preceding one of the prior art, since it does not require a third electrode interposed between the main electrodes, used to effect a pre-ionization of the insulating liquid contained in the parabolic cavity, in order to strike the electric discharge (see U.S. Pat. No. 4,734,894). In fact, in the present case the paraboloid 1 is directly immersed in the seawater, and since the latter is partially conductive, it allows to strike the electric discharge without any preliminary ionization of the medium.

Figure 8:
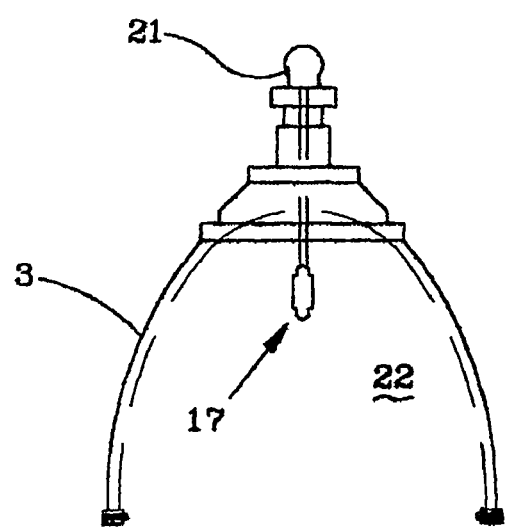
FIG. 8 shows a schematic vertical cross-section of the parabolic receiver forming part of the experimental prototype shown in FIG. 6.

Also with regard to the paraboloid-like reception transducer 3, simplifications and improvements have been made compared with the preceding echograph. First of all, the present transducer does not require a neoprene membrane like that used to close the base of the prior art paraboloid in order to retain an adequate liquid, since the present paraboloid 3 is also directly immersed in the seawater, as the transmission paraboloid itself. Moreover, the complicated mechanism connected to the piezoelectric sensor, allowing the latter to be positioned at the most suitable location around the focus, in order to receive the acoustic signal, and which was indispensable in prospecting applications of the soil—which is not always perfectly planar—, is now replaced by a simpler external device in the form of a mechanical articulated joint, the latter being able to appropriately orient the whole paraboloid when it is immersed in water. The portion of this articulated joint on the receiver 3 side is indicated in FIG. 8 by the reference numeral 21.

A brief description will now be given of the physical phenomenon of generation, development and collapse of the cavitation bubble, and of the technology that allows the realization of a bubble-implosion parabolic source.

Figure 2:
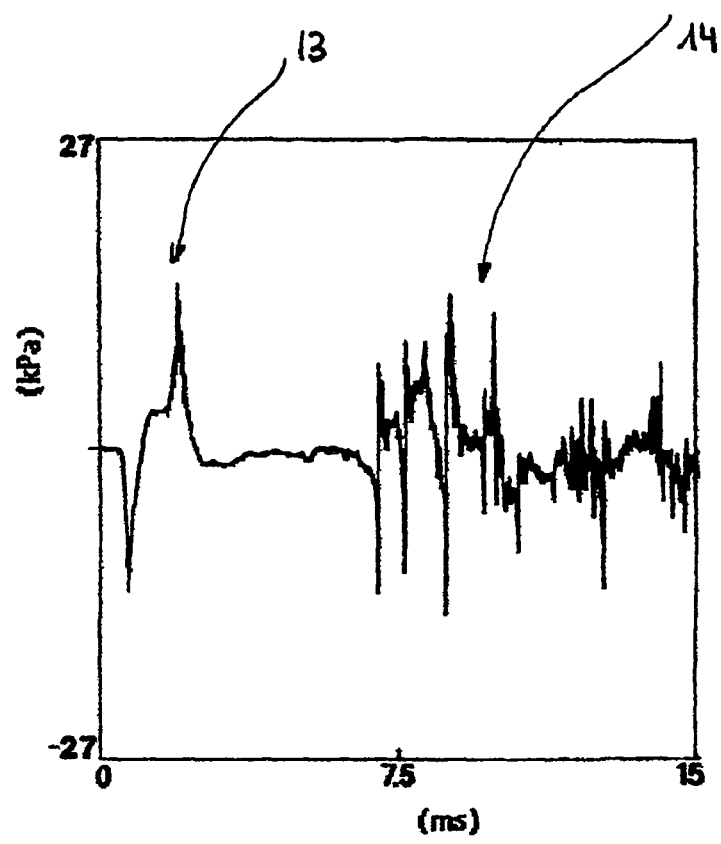
FIG. 2 shows an the acoustic wave in the time domain, which is generated by a conventional "sparker" source (transmitter)
Figure 3:
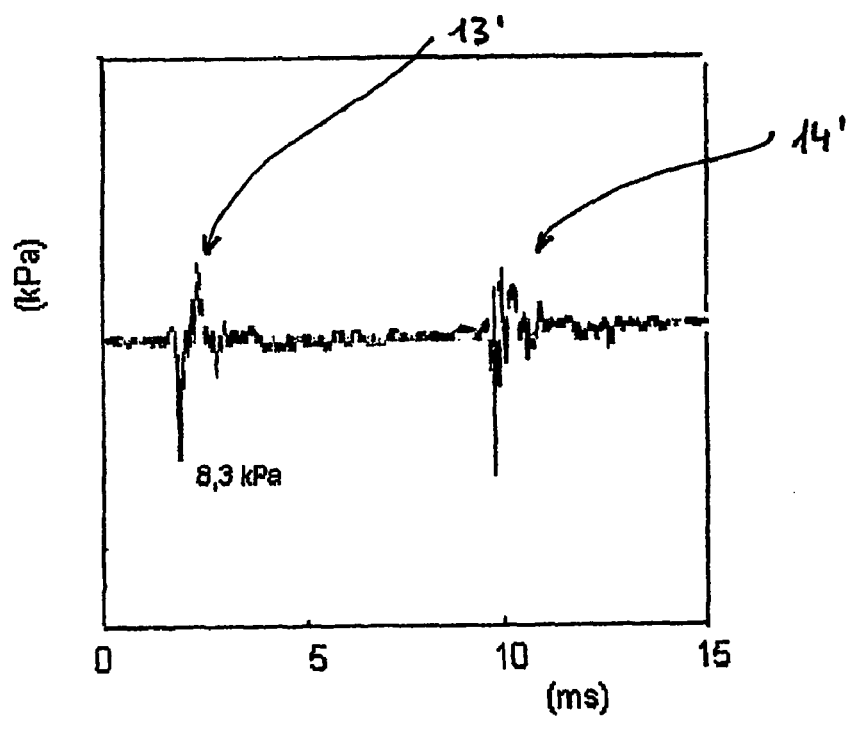
FIG. 3 shows the acoustic wave in the time domain, which is generated by a parabolic "sparker" source, and consisting only of a first signal and a second signal.
Figure 7:
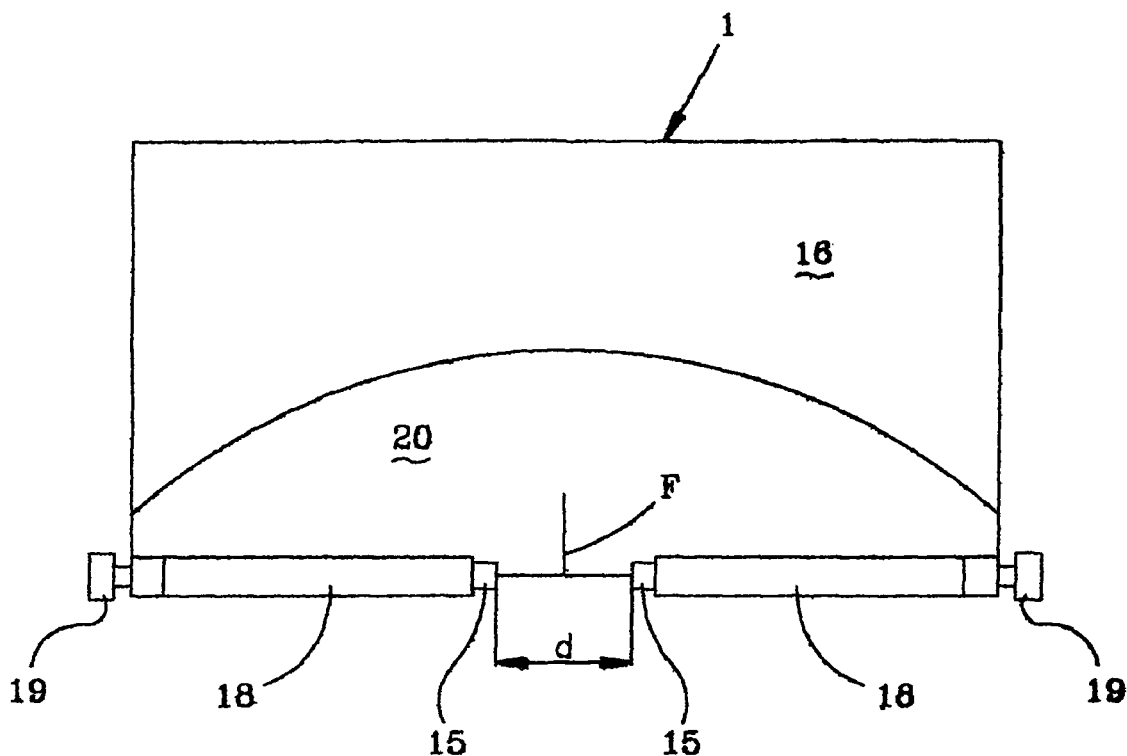
FIG. 7 shows a schematic-cross sectional view along a vertical plane, of the parabolic (that is, paraboloid-like) source (transmitter) of the "bubble implosion" kind, forming part of the experimental prototype shown in FIG. 6.

After closing the electric circuit of the sparker, an electric discharge flashes between the two electrodes (FIG. 7) positioned on both sides of the focus of the paraboloid, thereby generating a vigorous expansion of the vaporized liquid in consequence of the so-developed extremely high temperature gradient. This shock wave 13 ("breakdown") appearing on the oscillogram as a function of time, in the form of a compression pulse and a subsequent rarefaction pulse, is called "primary" pulse, and in conventional sparker devices its amplitude is higher than, or comparable with, the following pulses 14 which usually are called "cavitation" pulses (see FIG. 2). The first tests performed in water by the inventor, by employing appropriately designed parabolic sparker sources, have demonstrated the possibility of controlling and varying the relative amplitude of the primary pulse 13 with respect to the cavitation pulses 14. In particular, the multiple cavitations 14 can be minimized, thereby simplifying the so-called "signature" of the transmitted signal in such a way that it will contain only two pulses, that is, the primary signal 13', and the signal 14', which we will improperly call "cavitation signal" (see FIG. 3). The generation of the second pulse, which is more correctly ascribable to the implosion of a vapor bubble, is interpreted according to a theoretical model developed by the inventor himself and which is supported by experimental tests. This model can be summarized as follows. The electric discharge generates a plasma, which in turn contributes towards increasing the electric current flowing between the electrodes, and the temperature of the liquid suddenly increases within a volume of only some cubic millimeters (localized in the spark gap between the electrodes). This causes the formation and the increase in size of a vapor bubble that assumes the form of an initial shock wave. This first part of the phenomenon giving rise to the primary signal has a very short duration and is followed by an inertial and slower expansion of the vapor bubble, which, starting from an extremely small dimension, blows up until it reaches a maximum value R of its radius. Immediately thereafter the bubble starts imploding towards its center at a gradually increasing rate, until it has again reached a point-like dimension, which is so small that it can be neglected compared with the maximum value R. At this time a vigorous inversion of motion occurs, accompanied by a concomitant increase in pressure, that manifests itself as a real explosion. This is the so-called collapse of the bubble, giving rise to the second pulse named "bubble-implosion pulse". The latter occurs when the bubble wall velocity towards the bubble center reaches a value comparable with that of the sound velocity in the saturated vapor contained in the bubble.

Figure 4:
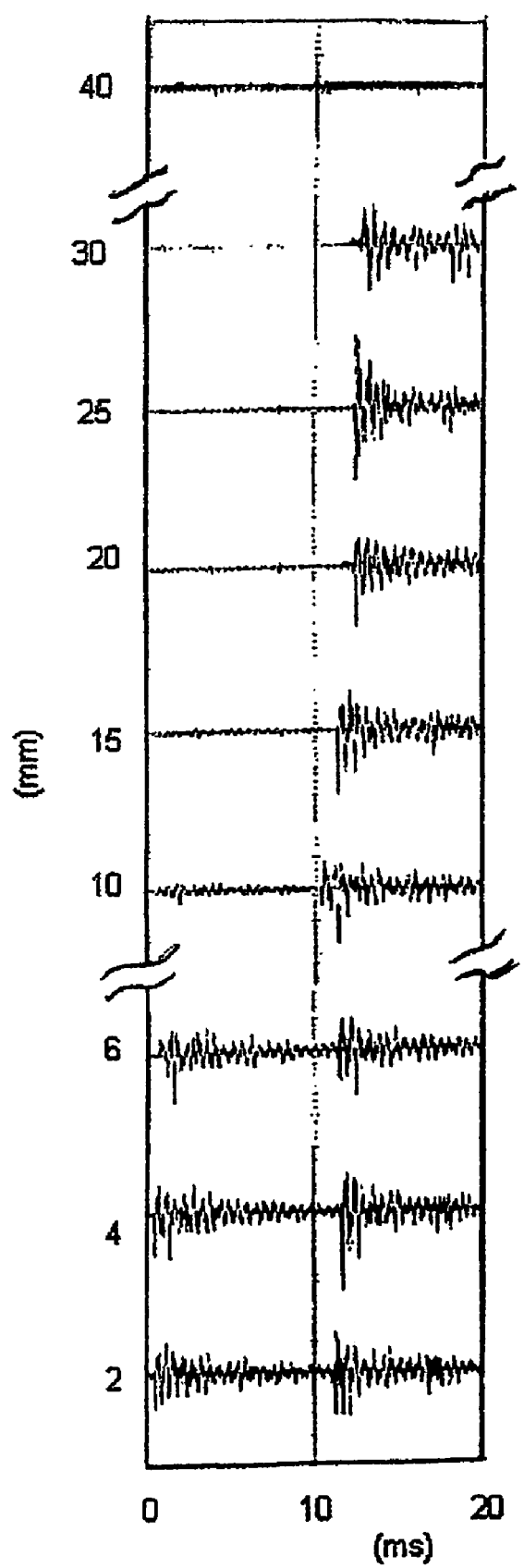
FIG. 4 illustrates several acoustic signals, in the time domain, emitted by the parabolic (or paraboloid-like) source of the present invention, for varying distances ("spark gaps") d between the electrodes.

To obtain a parabolic bubble-implosion source, that is, a transducer suited to concentrate almost all of the energy in the second pulse generated by the collapse of the vapor bubble, it is necessary to make use of the experimentally established diagrams derived by the inventor by means of tests performed in the water of a sea basin, and thereafter in a laboratory basin, on parabolic transducers whose electromechanical parameters have been varied appropriately. An example of this is given in FIG. 4, showing a sequence of acoustic signals (relative amplitude of acoustic pressure as a function of time) transmitted by a parabolic sparker source, for different values of the distance (spark gap) between the electrodes, but for the same (constant) value of electrostatic energy. It can be seen that for values of the spark gap exceeding 10 mm, the oscillogram has only one pulse, that is, the one ascribable to the vapor bubble implosion, and that the primary (or breakdown) pulse can be neglected altogether. The former signal disappears however for values of the spark gap exceeding the limit value of 30 mm, since in this circumstance, the conditions for the generation of the temperature gradient required to produce a vapor bubble do not exist anymore. If the spark gap is less than 10 mm, the primary (breakdown) signal appears as well, and this signal contributes to the dissipation of part of the electrostatic energy furnished to the system, thereby reducing the energy available to the vapor bubble.

An important parameter linked to the mechanical energy which is stored in the vapor bubble, and which is subsequently returned in the form of acoustical energy irradiated at the moment the collapse occurs, is the so-called "delay time", that is, the time interval between the breakdown and the appearance of the bubble pulse. This time period is correlated with the acoustic efficiency of the transmission transducer. In FIG. 4, it may be seen, for instance, that when the spark gap equals 25 mm, the delay time attains a maximum, and this corresponds also to a bubble-implosion signal having a maximum amplitude. By analyzing different oscillograms analogous to the one shown in FIG. 4, but corresponding to different values of electrostatic energy, and obtained under the ideal conditions of systematically performed tests in a laboratory basin, it was possible to derive an experimental relationship which can be summarized in the graphs of FIG. 5 and in similar ones (not shown) obtained under different conditions of water salinity. This experimental law has been confirmed by the theoretical model of the bubble, and it expresses the delay time as a function of the distance between the electrodes for various values of the electrostatic energy supplied to the system. The curves of FIG. 5 correspond to a parabolic transducer of reduced size compared with that used in sea water to carry out the tests of FIG. 4, since the former transducer is much more handy when tests are performed in a laboratory basin.

Figure 5:
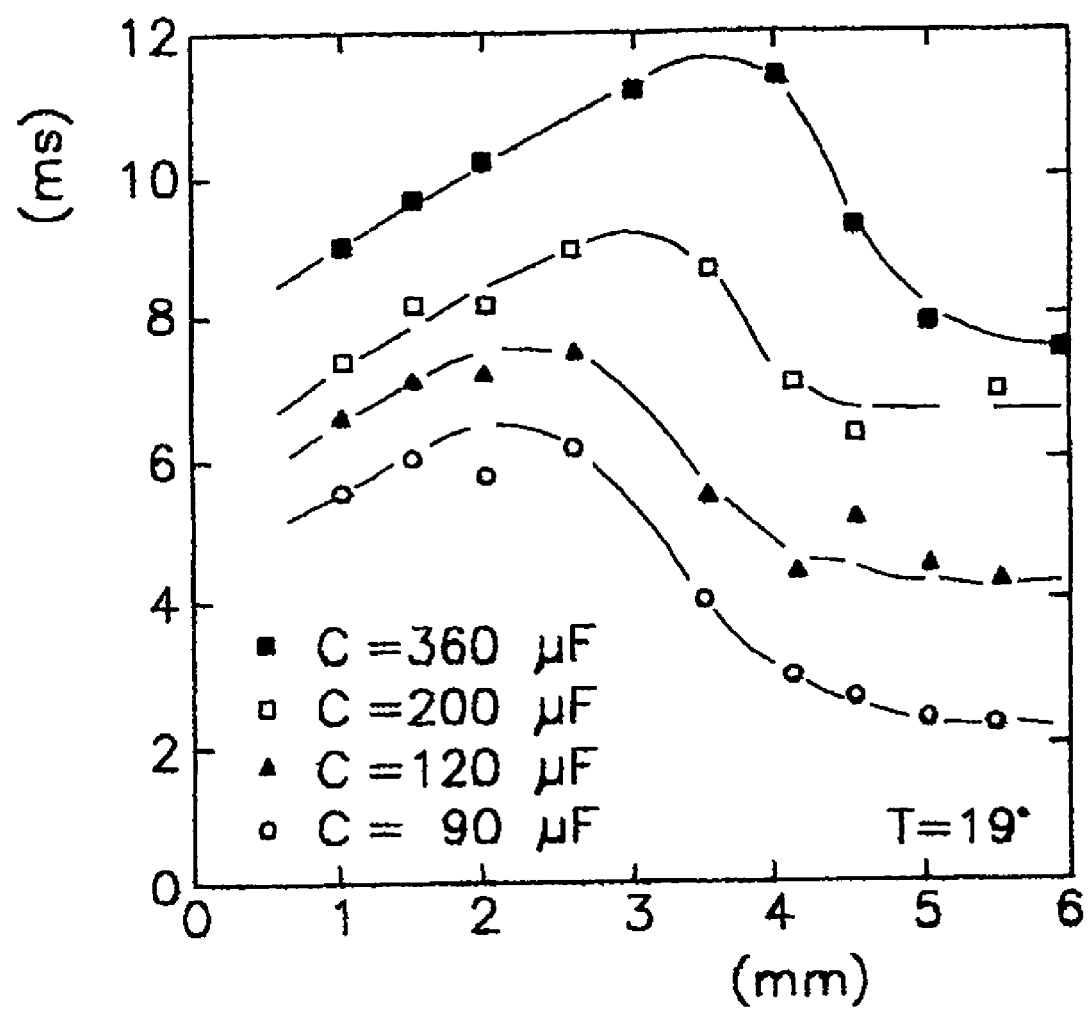
FIG. 5 illustrates the experimentally established relationship, allowing to design a sparker paraboloid-like source (or transmitter) of the "bubble implosion" kind, after fixing the value of the capacity (C) of the condenser bank and after selection of the value of the distance (d), that maximizes the delay time between the primary pulse and the bubble implosion, or in other words, that maximizes the acoustic source efficiency.

Moreover, the salinity of the water contained in the laboratory basin, which was less than that of seawater, does not invalidate at all the general validity of the law shown in the graphs of FIG. 5, since the latter are simply translated towards higher values of the spark gap with increasing water salinity. The same figure also shows the values of the capacitance C of the condenser array (condenser bank) used by the electric control unit, instead of the electrostatic energy values (E=½ CV$^2$); however the latter are easily obtainable by the knowledge of the potential difference V=2250 V applied to the electrodes of the sparker. It can be noted that the time delay, and consequently the acoustic efficiency of the transducer, is not a monotonic function of the distance existing between the electrodes. On the contrary, this time delay reaches a maximum for a well-defined value of the spark gap, which shifts towards greater values of the spark gap when the capacity—or energy—is increased. These experimental results are in agreement with the following theoretical relationship:

$$\eta = 5.455 \, t^3 [p - p_V(T)]^{5/2} / (\rho^{3/2} E) \quad (1)$$

The relationship (1) expresses the conversion efficiency η of the electric energy E, in mechanical energy stored in the bubble (taking into account also the irradiated acoustic energy), as a function of the difference p-p$_V$(T) between the pressure of the environment and that of the saturated vapor in the bubble at the temperature T, of the density ρ of the liquid, and of the delay time t. The high dependence of the efficiency from the delay time is immediately obvious. This relationship has been deduced by the inventor from a simpler formula, giving the collapsing time of a bubble of saturated vapor, starting from an initial radius R until its size-reduction to a negligible dimension, which was first derived by Lord Rayleigh (see Lord Rayleigh, "On the pressure developed in a liquid during the collapse of a spherical cavity", Phil. Mag. (1917), vol. 34, pages 94-98) to explain the sound emitted from vapor bubbles formed in a tea kettle.

Summing up, the relationship (1) tells us that for the same electrostatic energy supplied to the system, and for constant pressure and temperature, the increase in the time delay causes a noticeable increase in the conversion efficiency of the electric energy E in mechanical energy stored in the bubble, wherein the latter includes the acoustic efficiency of the source. The maximization of "t" therefore constitutes the fundamental principle on which the method of the present invention is based in order to optimize the efficiency of the bubble-implosion source. To realize this source, in general one proceeds in the following manner. After having manufactured a metallic paraboloid of sufficient thickness, so as to prevent energy dispersions through its walls and having a predetermined focal length which is sufficiently long (e.g. greater than 3 cm) to permit a free development of the bubble about the focus, without being hindered by the paraboloid walls, two tungsten electrodes are provided, which can be adjusted with respect to the focal point by using suitable external means based on micrometer screws. The distance "d" (in mm) between the two electrodes must be selected so as to maximize the acoustic efficiency, that is, the delay time, making use, to this end, of the law shown in the graphs of FIG. 5 (abscissa=spark gap; ordinate=time delay (ms)), and making use of further graphs that could be derived under other salinity conditions of the water. Once a value of the supply energy has been chosen (corresponding to a well-defined value of the capacitance after fixing of the potential difference applied to the electrodes), the spark gap value corresponding to the maximum value of the delay time is obtained from the graph.

Figure 6:
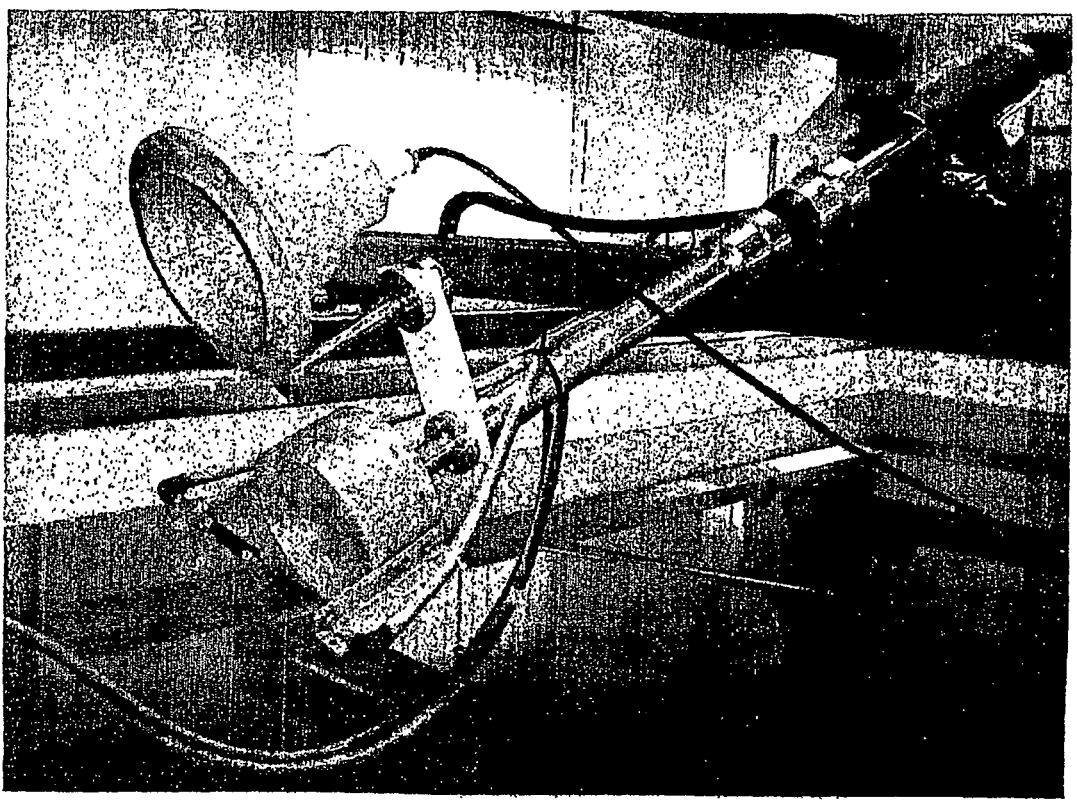
FIG. 6 shows an experimental prototype of the echographic apparatus that was installed by the inventor on the basin of the Laboratory of Underwater Acoustics.

As an illustrative but non-binding example of all possible realizations of the present invention, we will describe the features of the experimental prototype represented in the photograph of FIG. 6, which shows the transmission and reception transducers arranged at the edge of the calibration basin of the "Laboratorio di Acustica Subacquea" (underwater acoustics lab). This prototype has been realized appositely for submarine archaeology applications, which cover depths below the seabed comprised in the interval from some meters up to some tens of a meter. For this reason, the distance between the two transducers is adjusted during the prospecting in the sea, about values that are substantially low (approximately 50 cm). For greater prospecting depths, this distance is suitably increased by making the transducers slide on an adequate support or mechanical guide. The transmission transducer 1, schematically shown in FIG. 7, has the following geometric dimensions: height=11 cm; inner diameter of the base=20 cm; focal length=10 cm. The tungsten electrodes 15 have a hemispheric shape and have a radius equal to 5 cm. Moreover, they have been arranged at a distance d=25 mm from each other, so as to produce, for an energy corresponding to 720 Joule, the maximum delay time, as may also be seen from the oscillograms of FIG. 4 referring to tests carried out in salt water (salinity=3.4%) with the same transducer.

Figure 9:
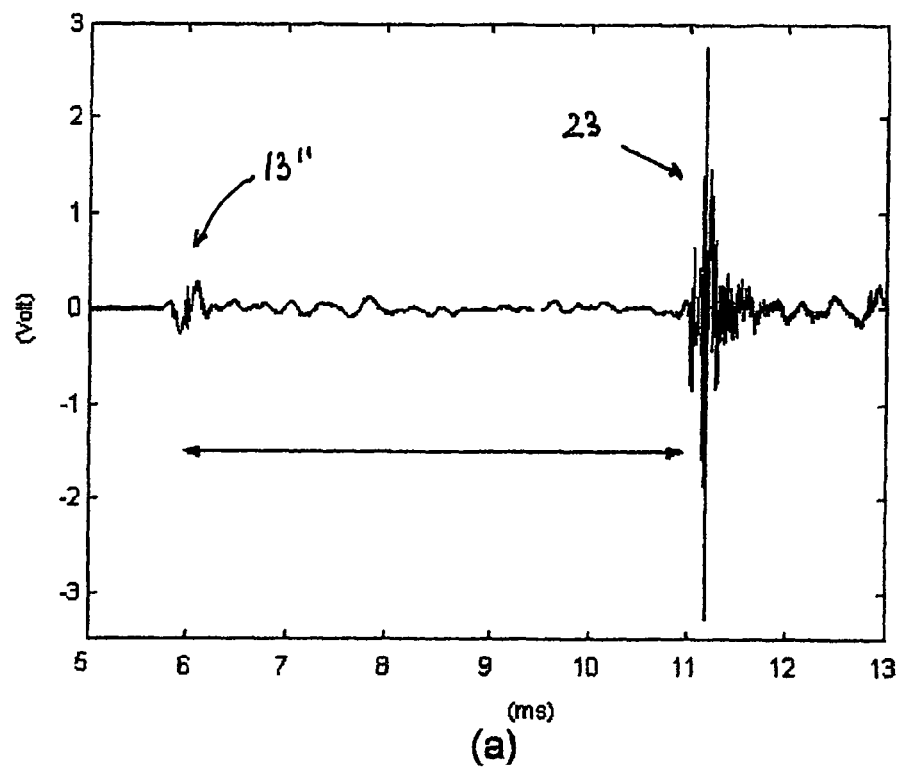
FIG. 9 shows the features of the "bubble implosion" acoustic wave generated by the parabolic transmitter, in the time domain (a) and in the frequency domain (b) respectively, with FIG. 9(a) giving the amplitude in Volts and FIG. 9(b) the relative amplitude in dB (on the ordinate)
Figure 9:
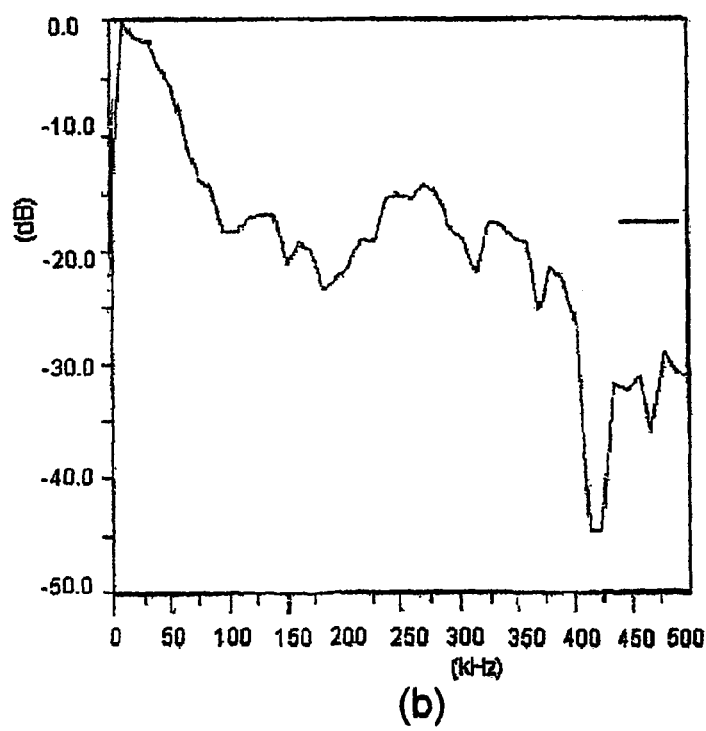

The paraboloid has been obtained by turning a massive cylinder 16 of aluminum (size: 11 cm×22 cm), which therefore was sufficiently thick to prevent dispersions of acoustic energy due to backward transmission through the walls. The reception transducer, schematically shown in FIG. 8, is made of aluminum as well, and it has the following geometric dimensions: height=22 cm, inner diameter of the base=20 cm, focal length=1.2 cm, wall thickness=about 1 cm. The ceramics 17 which is located at its focus has a flat frequency response up to about 400 kHz. Now, turning our attention to FIGS. 7 and 8, in these figures the numeral 20 denotes the internal parabolic region occupied by the water, numerals 18 denote an insulating coating of the electrodes, numerals 19 denote the spark gap adjusting screws, and numeral 16 indicates the aluminum block forming the paraboloid of the source (or transmitter 1). Furthermore, numeral 21 denotes the coupling means used to realize the mechanical joint for orienting the receiver 3. The reference numeral 22 denotes the parabolic inner region of the receiver 3, which is occupied by the water. The graphs of FIG. 9 show typical features of the acoustic wave generated by the transducer prototype of the "bubble-implosion kind", in the time domain (a) and in the frequency domain (b) respectively. The signal has been detected at a distance of 1 meter along the axis of the paraboloid 1—while the latter was immersed in the water of the laboratory calibration basin—by using the above-described reception paraboloid 3. The supplied electrostatic energy was in this case equal to 506 Joule, and the applied potential difference was 2250 V, while the capacitance was fixed at the value of 200 μF. It can be clearly seen that almost all of the acoustic energy irradiated by the transducer 1 is concentrated in the second pulse 23 due to bubble implosion, whereas the primary (or breakdown) signal 13" is nearly negligible. Moreover, the frequency spectrum shows intense spectral components down to about 50 kHz, and a wide and almost flat frequency interval from 100 kHz up to about 400 kHz, showing variations within some dB. None of the commercially available devices of the sonar type is able to generate a frequency band which is so broad and at the same time so rich in intense components at lower frequencies that are required to penetrate into the seabed.

Figure 10:
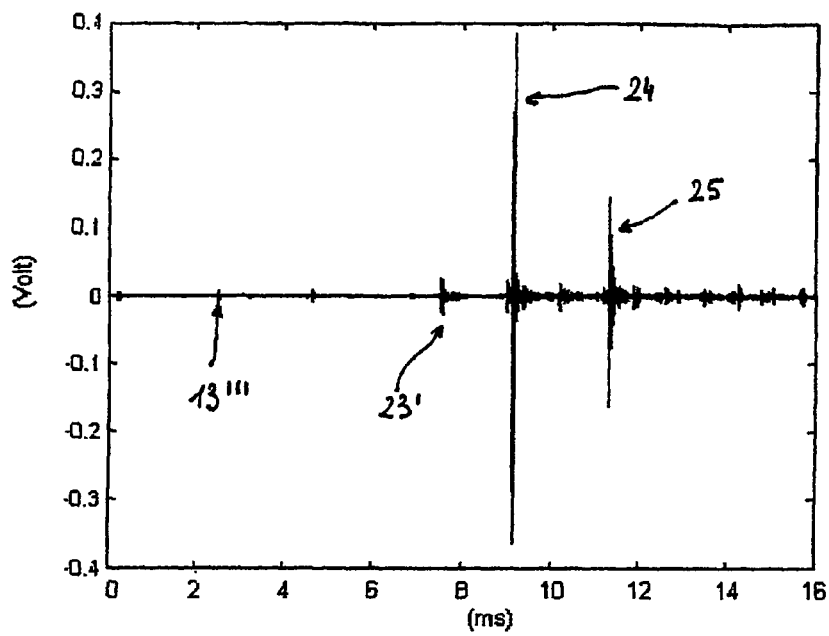
FIG. 10 shows an example of a typical test carried out in a laboratory basin, where T denotes the acoustic image of a tube immersed in water at a certain distance from the basin bottom whose acoustic image is B, and specifically, the acoustic pulses of FIG. 10(a) refer to a situation in which the position of the apparatus (echograph) was taken along the vertical passing through the target (T), and FIG. 10(b) was obtained from 29 complete scanning measurements which made it possible to reconstruct the "acoustic images" T and B.
Figure 10:
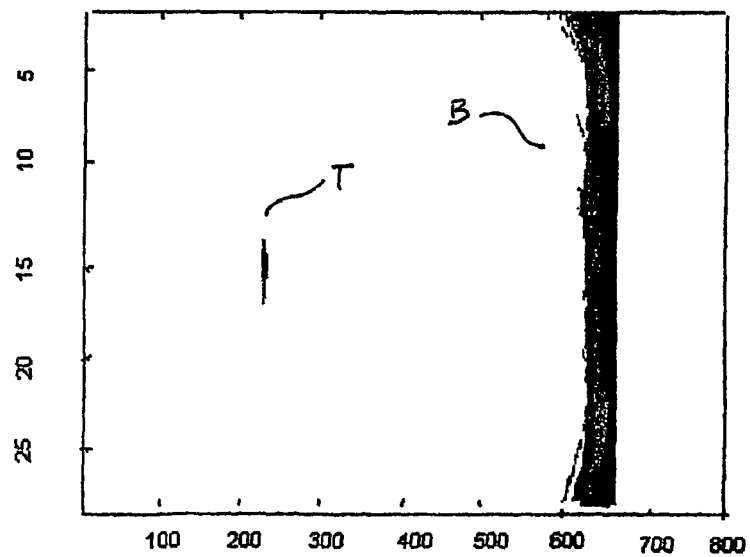

In FIG. 10 (a) there is shown a typical test result, obtained in the laboratory basin, in a situation in which the entire ultrasound system was arranged to effect a prospecting above a cylindrical target (diameter=14 cm) immersed in water at about 1.5 meters above the bottom of the 6-meter deep basin. One may note, in chronological order, the presence of: the primary signal 13'"; the bubble implosion signal 23' received laterally and attenuated by the walls of the reception paraboloid; the echo 24 of the target; and, finally, the echo 25 due to the basin bottom.

Figure 11:
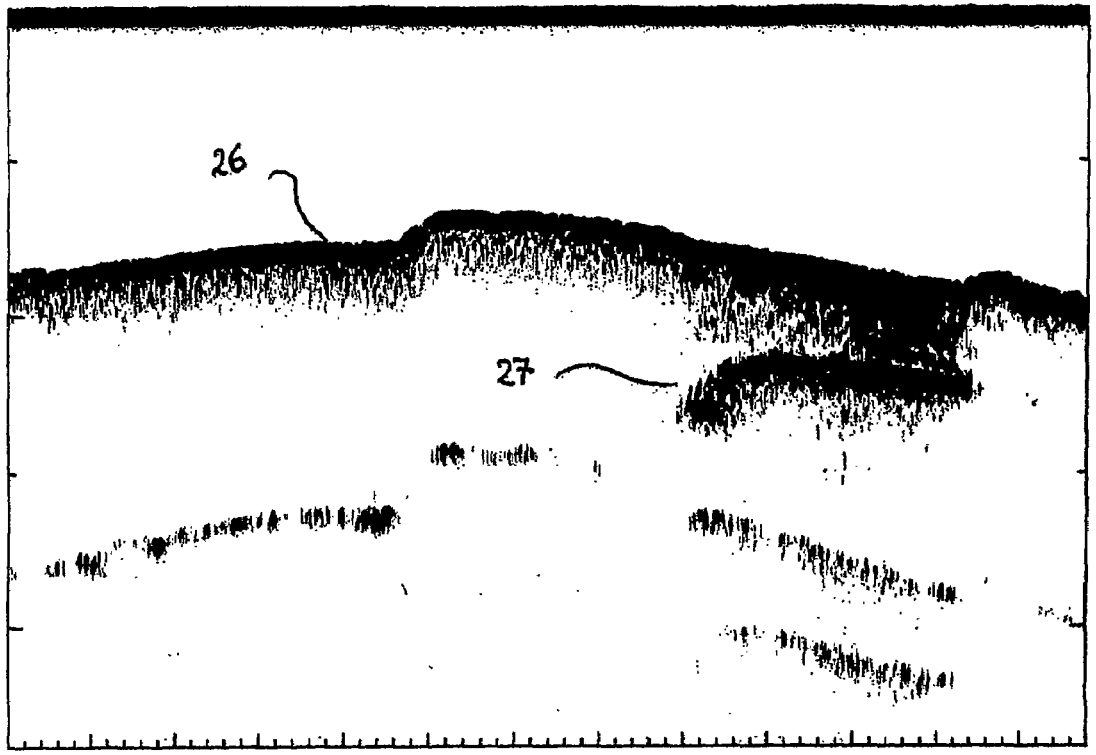
FIG. 11 shows, in the form of acoustic images, the result of two parallel prospecting operations performed in a shallow seabed, these results highlighting the presence of an antique vault-shaped structure located about 1.5 meters below the seabed, which probably formed part of the buildings of an ancient Roman harbor.
Figure 11:
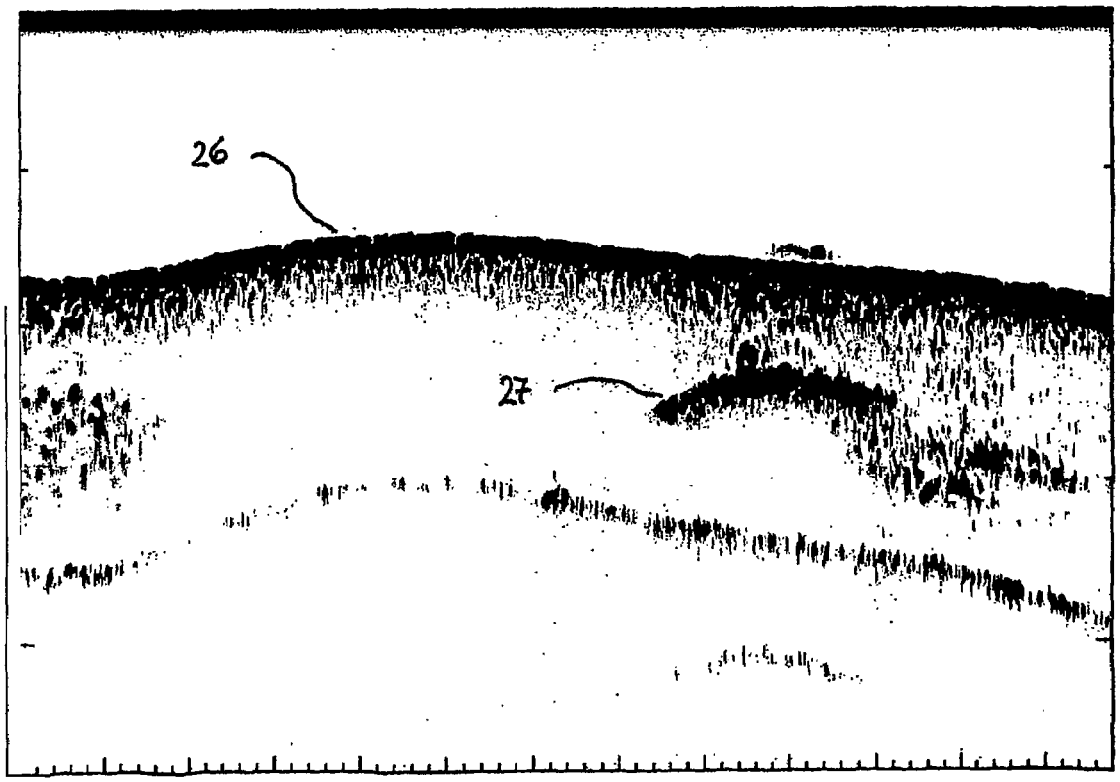

This oscillogram, forming part of a set of 29 measurements performed during a scanning above the target, corresponds to a position of the echograph along the vertical passing through the target. However, to obtain an acoustic image of the object it is necessary to adequately process all signals of the whole scanning operation effected above the object. FIG. 10(b) shows the acoustic image of the object obtained in this way, after an appropriate processing of the signal ("beam forming"). To this end, the inventor of the present invention has developed a signal processing software for this echograph, suited to provide high-resolution acoustic images, including those relating to macroscopic anomalies of the seabed, and to small targets of simulation experiments performed with scale models in a lab basin. In the latter case, the scale of the models and the frequency region are selected in such a way as to allow, using physical similarity considerations, extrapolation of the results so that they are applicable to real objects. Actually, though these categories of experiments are different as concerns the involved scale and frequency band, they have in common the same physical approach, that is, the interaction of the acoustic waves with the relevant objects and structures, causing the diffusion and reflection of acoustical energy suited to provide information which is detectable by means of appropriate sensors. If this information is presented in the form of maps, namely as a planar or tridimensional distribution of an appropriate acoustic parameter (e.g. the acoustic intensity), one obtains so-called acoustic images that have a direct correlation with the shape and structure of the analyzed (or detected) objects. In FIG. 11, there are shown two examples of acoustic images obtained by a scanning performed with the present ecograph in a shallow sea basin. These images relate to two parallel scanning operations performed at a mutual distance of 5 meters. Some inhomogeneities located below the seabed 26 are visible in these figures, and particularly the vault-shaped structure 27 which appears in both scanning images and which is buried at about 1.5 meters below the seabed. This vault-shaped structure presumably formed part of ancient buildings of a harbor of the Roman age, now buried below the sediments.

INDUSTRIAL APPLICABILITY

Lastly, we mention the most important applications in which the present invention may validly be utilized. The system is so versatile as to permit explorations at low (0-50 meters) and medium depths (50-100 meters) in the seabed, or even at higher depths, provided it is adequately designed and sized.

This system has been devised principally to permit exploration of anomalies and inhomogeneities in sea sediments, and for all applications involving sediments, such as mineralogical applications concerning the search of metallic nodules or archaeological finds buried in the sediments.

However, it could be applied as well in oceanographic explorations, in which high resolutions and powers are required for signal propagation through large distances.

The invention claimed is:

1. An acoustic echographic method for underwater exploration, making use of the bubble-implosion effect, characterized in that it comprises the following steps:

the realization of a parabolic transmitter, which is immersed in water and is open at its base, said transmitter having a thickness sufficient to prevent energy dispersions through its walls and presenting a predetermined focal length, the latter being selected to be sufficiently long so that the expansion of the bubble generated by the electric discharge occurring between two electrodes that are symmetrically arranged with respect to the focus is not hindered by the walls of the paraboloid formed by the transmitter; and wherein said electrodes are adjustable in the direction of the line that joins them, to allow to increase or decrease their reciprocal distance;

the realization of a parabolic receiver, said receiver being open at its base, being immersed in water, and having a pressure sensor arranged substantially at the focus of the receiver;

the connection of said transmitter to an electronic unit, having a function of control and energy supply, said electronic unit supplying electrostatic energy to said electrodes and transmitting an electric trigger signal to means of the receiver;

the connection of said receiver to data processing and display means, for obtaining diagrams of the type of an oscillogram relating to received signals, and/or for obtaining acoustic images of these received signals;

and a last step, in which, given a certain value of the electrostatic energy to be supplied to the electrodes, and given a certain degree of water salinity, the distance between said two electrodes is adjusted so that a maximum delay time is obtained between the occurrence of the breakdown electric discharge and a signal due to bubble implosion of the bubble formed during the same discharge, said maximum delay time of the bubble implosion signal being unequivocally correlated to the maximum acoustic efficiency value, given by the ratio between the electrostatic energy and the acoustic energy of the bubble implosion signal, and wherein, under these circumstances, the amplitude of the primary signal directly generated by the breakdown discharge is minimal or negligible.

2. A method according to claim 1, wherein the distance between the receiver and transmitter, and/or the energy, are all adjusted during prospecting operations according to the depth of the region below the seabed to be subjected to the survey.

3. A method according to claim 1, wherein said electrodes are made of tungsten.

4. A method according to claim 1, wherein the employed pressure sensor is made of a piezoelectric ceramics having a flat frequency response, for instance up to values of about 400 kHz.

5. A method according to claim 1, wherein the orientation of the receiver may be varied for obtaining a better reception of the echo generated by the reflection of the bubble-implosion signal on the seabed, on the sediments, on an archaeological find, and/or on an object which is immersed in water at a certain distance from the seabed.

6. A method according to claim 1, including various scanning operations, performed along parallel straight lines in order to obtain an acoustic image, and/or including several measurements, effected along a horizontal line which comprises a position located on the vertical line passing through a hypothetical object or a possible archaeological find to be detected, analyzed, or displayed.

7. A method according to claim 6, wherein the acoustic images, obtained in map form, namely as planar or tridimensional distribution of an acoustic parameter such as the acoustic intensity, are derived by means of a signal processing software, suited to provide high-resolution acoustic images, and which has been developed on scale models in a lab basin, and wherein the selected model scale and frequency region are such to permit extrapolation of the results to include real conditions, based on physical similarity considerations.

8. An apparatus for carrying out the acoustic echographic method based on the bubble-implosion effect comprising:
   a parabolic transmitter associated with a control unit, the latter being used to supply electrostatic energy to first and second electrodes arranged substantially symmetrically to a focus so as to face each other at a mutual distance, the distance being adjustable with a gap adjusting device; and
   a parabolic receiver, connected to data processing and display means triggered by an apposite trigger signal, said receiver including a pressure sensor which is substantially located at the focus of the receiver;
   wherein, the mutual distance between the electrodes is adjusted so that, given a certain value of the electrostatic energy to be supplied to the electrodes, and given a certain degree of water salinity, a maximum delay time is obtained between the occurrence of the breakdown electric discharge and a signal due to bubble implosion of the bubble formed during the same discharge, said maximum delay time of the bubble implosion signal being unequivocally correlated to the maximum acoustic efficiency value, given by the ratio between the electrostatic energy and the acoustic energy of the bubble implosion signal, so that under the prevailing circumstances the amplitude of the primary signal directly generated by the breakdown discharge is minimal or negligible, and
   wherein the thickness of the walls of the transmitter renders substantially negligible the bubble implosion signal passing through said walls which is directly transmitted towards the receiver, and the focal length of the transmitter is selected so that it does not hinder the formation of the bubble until it reaches its maximum size.

9. An apparatus according to claim 8, wherein said electrodes are made of tungsten.

10. An apparatus according to claim 8, wherein said regulation means are micrometer screws.

11. An apparatus according to claim 8, wherein said sensor is a piezoelectric ceramics with a flat response up to about 400 kHz.

12. An apparatus according to claim 8, wherein the data processing and display means, which are triggered by an apposite trigger signal sent by the electronic unit, include a ADC filter, a DSP microprocessor card, a dedicated personal computer, a display monitor for visualizing acoustic images, a memory, and possibly also visualization means for the display, in the form of an oscillogram, of the analog signal that constitutes the echo.

13. An apparatus according to claim 8, wherein the parabolic transmitter forms a block of suitable material, for instance aluminum, and is obtained by means of turning from such block, which may have any suitable form, e.g. cylindrical.

14. An apparatus according to claim 8, wherein the receiver has a mechanical articulated joint system allowing its orientation.

15. An apparatus according to claim 8, having a horizontal guide rail for the adjustment of the mutual distance of the electroacoustic transducers.

* * * * *